(12) United States Patent
Takai et al.

(10) Patent No.: US 6,499,557 B2
(45) Date of Patent: Dec. 31, 2002

(54) POWER STEERING

(75) Inventors: Masashi Takai, Gifu (JP); Naoto Shima, Aichi (JP); Fumihide Kozuma, Kanagawa (JP); Norimasa Amano, Kanagawa (JP); Noboru Shimizu, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 10/081,604

(22) Filed: Feb. 21, 2002

(65) Prior Publication Data

US 2002/0074183 A1 Jun. 20, 2002

Related U.S. Application Data

(62) Division of application No. 09/734,980, filed on Dec. 12, 2000.

(30) Foreign Application Priority Data

Dec. 13, 1999 (JP) .......................................... 11-353059
Mar. 9, 2000 (JP) ......................................... 2000-64681
Mar. 16, 2000 (JP) ......................................... 2000-74618

(51) Int. Cl.[7] ................................................. B62D 5/06
(52) U.S. Cl. ....................................... 180/422; 180/423
(58) Field of Search ................................. 180/422, 423, 180/421; 701/41, 42

(56) References Cited

U.S. PATENT DOCUMENTS

| | | | | | |
|---|---|---|---|---|---|
| 5,538,095 A | * | 7/1996 | Haga et al. | .................. | 180/423 |
| 5,577,579 A | * | 11/1996 | Haga et al. | .................. | 180/423 |
| 5,740,879 A | * | 4/1998 | Emori et al. | .................. | 180/423 |
| 6,041,883 A | * | 3/2000 | Yokota et al. | ............... | 180/441 |
| 6,148,947 A | * | 11/2000 | Eberhart et al. | ............ | 180/422 |
| 6,167,334 A | * | 12/2000 | Liubakka et al. | ........... | 180/422 |
| 6,193,009 B1 | * | 2/2001 | Chino et al. | ................. | 180/422 |

\* cited by examiner

Primary Examiner—Daniel G. DePumpo
(74) Attorney, Agent, or Firm—Steinberg & Raskin, P.C.

(57) ABSTRACT

For an energy-saving type control, a value of a control low rate QP controlled by a flow control valve V is closer to a value of a flow rate required by an output side such as a power cylinder 8, a steering valve 9 or the like, to suppress a driving torque of a pump P. An excitation current I of a solenoid SOL is specified on the basis of a solenoid current instruction value $I_T$ based on a steering torque and a solenoid current instruction value $I_S$ defining a standby flow rate.

5 Claims, 10 Drawing Sheets

POWER STEERING

CROSS REFERENCE TO RELATED APPLICATION

The present application is a divisional application of U.S. patent application Ser. No. 09/734,980 filed on Dec. 12, 2000.

BACKGROUND OF THE INVENTION

1. Field of the Invention

This invention relates to a power steering including a flow control valve for controlling a flow introduced toward a power cylinder.

2. Description of Related Art

A flow control valve installed in this type of power steering has a spool which is mounted inside a main body and has one end facing one of pilot chambers which is communicated with a pump port at all times and the other end facing the other pilot chamber incorporating a spring. A fixed orifice is formed downstream from the other pilot chamber. Pressure oil is introduced through the fixed orifice into a steering valve for controlling a power cylinder.

on the other hand, movement positions of the spool is controlled with pressure balance between both pilot chambers wherein pressure upstream from the orifice is set as pilot pressure of the one pilot chamber and pressure downstream from there is set as pilot pressure of the other pilot chamber.

It is configured to use the movement position of the spool for distribution of the pressure oil between a control flow rate QP of the flow for introducing the amount of discharge from a pump into the steering valve and a return flow rate QT for making the flow circulation-return toward a tank or a pump.

The above spool is designed to be maintained in a constant state of differential pressure after and before the fixed orifice, to supply a constant control flow rate QP to the steering valve for controlling the power cylinder at all times.

In such conventional power steering, a constant control flow rate QP is supplied from the flow control valve to the steering valve for controlling the power cylinder at all times. In other words, regardless of vehicle speed or steering conditions, the control flow rate QP is continuously supplied to the steering valve at a constant control flow rate QP at all times.

However, if the control flow rate QP is defined regardless of the vehicle speed or a steering status, for example, when a relation of QP with respect to the flow rate QM required by the power cylinder becomes QP>QM, the need for returning the resulting surplus flow rate to a tank through the above steering valve arises.

As described above, returning the surplus flow rate to the tank through the steering valve results in increase of a pressure loss in the circuit. Put another way, the pump is required to continue consuming the driving torque to make up for the amount of pressure loss. Therefore, as driving torque increases, energy consumption increases.

Moreover, since the control flow rate QP is set in accordance with the maximum required flow rate for the power cylinder, under present circumstance, some surplus flow rate is often returned to the tank. Thus, the conventional system has a problem associated with increase of energy consumption.

SUMMARY OF THE INVENTION

It is an object of the present invention to provide a power steering which in capable of reducing an energy loss to a minimum by controlling a control flow rate QP as travelling conditions or a steering status of a vehicle.

The present invention is predicated on configuration in which: a spool is mounted in a main body and has one of ends facing one of pilot chambers which communicates with a pump port at all times and the other end facing the other pilot chamber incorporating a spring. An orifice is provided downstream from the one pilot chamber. Pressure oil is introduced through the orifice into a steering valve for controlling a power cylinder. A movement position of the spool is controlled with a pressure balance between both the pilot chambers when pressure upstream from the orifice is set as a pilot pressure of the one pilot chamber and pressure downstream from the orifice is set as a pilot pressure of the other pilot chamber. The pressure oil is distributed between a control flow rate QP for introducing the amount of discharge from a pump toward the steering valve, and a return flow rate QT for making the pressure oil circulation-return toward a tank or the pump.

Based on the above power steering, a first invention features as follows: the orifice is a variable orifice controlling the degree of its opening in accordance with an excitation current of a solenoid. Also, a controller is provided for controlling the excitation current of the solenoid for the variable orifice. The controller is connected with a steering torque sensor, and calculates or stores a solenoid current instruction value $I_T$ in response to a steering torque signal from the steering torque sensor. Further, a solenoid current instruction value $I_S$ for standby is added to the solenoid current instruction value $I_T$. Then the excitation current I of the solenoid SOL for the variable orifice is controlled based on the added instruction value.

According to the power steering of the first invention, the control flow rate QP can be controlled by means of detecting the steering torque. Therefore, the control flow rate QP is appropriately secured to accomplish an energy-saving type control.

Also, when the steering wheel is held stationary, the control flow rate QP can be appropriately secured by means of the steering torque thereby to allow the vehicle to resist a self-aligning torque.

Further, the standby flow rate can be secured even when the solenoid current instruction value $I_T$ based on the steering torque is zero, for example, in travel of the vehicle in a straight line. Therefore, the power steering can be prevented from seizure, and is capable of handling disturbances caused by a kick back or the like, and further sufficient response can be ensured.

In any of times when the steering wheel is turned, when the steering wheel is held stationary, and when the vehicle travels in a straight line, the control flow rate QP is appropriately secured not to increase torque for driving the pump P more than necessary thereby to attain the accurate energy-saving control.

In the power steering, a signal of the steering torque, the vehicle speed or the like has been conventionally used for controlling a steering reaction force on the output side or controlling sensitivity of the steering valve. However, the present invention has been made under the theme of energy savings and therefore uses a signal of the steering torque, the vehicle speed or the like to control the control flow rate QP, which has not been seen in prior art.

Moreover, in the present invention, the steering torque is directly detected thereby to obtain a more accurate value without need of other sensors or calculating means.

The present invention approaches the subject of energy savings and has the principal feature in that a signal of the steering torque, the vehicle speed or the like is used.

A second invention has configuration in which the controller is connected to a vehicle speed sensor, and calculates or stores a solenoid current instruction value $I_V$ in response to a vehicle speed signal from the vehicle speed sensors while multiplying the solenoid current instruction value $I_T$ by the solenoid current instruction value $I_V$, and adding the solenoid current instruction value $I_S$ for standby to the multiplied value.

A third invention has configuration in which the controller is connected to a vehicle speed sensor, and calculates or stores a solenoid current instruction value $T_V$ in response to a vehicle speed signal from the vehicle speed sensor, while setting the solenoid current instruction value $I_V$ in response to the vehicle speed signal as a threshold value based on the solenoid current instruction values $I_T$, and adding a solenoid current instruction value under the set threshold value to the solenoid current instruction value ($I_S$) for standby.

A fourth invention has configuration in which the controller multiplies characteristics of the excitation current I of the solenoid and the control flow rate QP determined by the degree of opening of the variable orifice, and characteristics of the steering torque and the solenoid current instruction value $I_T$ together, to allow the steering torque and the control flow rate QP, which is determined by the degree of opening of the variable orifice in accordance with the solenoid current $I_T$, to have linear characteristics.

According to the power steering of the second invention, since the power steering is designed in a speed sensitive types the energy-saving type control in accordance with the vehicle speed is allowed.

According to the power steering of the third invention, it is designed in a vehicle-speed sensitive type, but the solenoid current instruction value $I_V$ based on the vehicle speed is used as a limiter, resulting in maintaining further sufficient response.

According to the power steering of the fourth invention, since the control flow rate QP with respect to the steering torque is permitted to have further linear characteristics, a driver's steering feel is improved.

Based on the aforementioned power steering, a fifth intention features as follows: the orifice is a variable orifice controlling the degree of its opening in accordance with an excitation current I of a solenoid. Also, a controller is provided for controlling the excitation current I of the solenoid for the variable orifice. The controller is connected with a steering angle sensor, to store or calculate a steering angle θ and a steering angular velocity ω in accordance with a steering angle from the steering angle sensor, while calculating or storing a solenoid current instruction value $I_θ$ in accordance with the steering angle θ and a solenoid current instruction value $I_ω$ in accordance with the steering angular velocity ω, and adding the solenoid current instruction values $I_θ$ and $I_ω$, and further adding the added value to a solenoid current instruction value $I_S$ for standby, and then controlling the excitation current I of the solenoid for the variable orifice based on the finally added instruction value.

A sixth invention has configuration in which the controller is connected to a vehicle speed sensor, and calculates or stores a solenoid current instruction value $I_V$ in response to a vehicle speed signal from the vehicle speed sensor, while multiplying the added value of the solenoid current instruction values $I_θ$ and $I_ω$ by the solenoid current instruction value $I_V$, and adding the solenoid current instruction value $T_S$ for standby to the multiplied value.

A seventh invention has configuration in which the controller is connected to a vehicle speed sensor, and calculates or stores a solenoid current instruction value $I_V$ in response to a vehicle speed signal from the vehicle speed sensor, while setting the solenoid current instruction value $I_V$ based on the vehicle speed signal as a threshold value with respect to the added value of the solenoid current instruction values $I_θ$ and $I_ω$, and adding a solenoid current instruction value under the set threshold value to the solenoid current instruction value $I_S$ for standby.

Based on the aforementioned power steering, a eighth invention features as follows: the orifice is a variable orifice controlling the degree of its opening in accordance with an excitation current I of a solenoid. Also, a controller is provided for controlling the excitation current I of the solenoid for the variable orifice. The controller is connected with a steering angle sensor to calculate or store a steering angle θ and a steering angular velocity ω in accordance with a steering angle from the steering angle sensor, while storing or calculating a solenoid current instruction value $I_θ$ in accordance with the steering angle θ and a solenoid current instruction value $I_ω$, in accordance with the steering angular velocity ω, and selecting any larger solenoid current instruction value from the solenoid current instruction values $I_θ$ and $I_ω$, and adding a solenoid current instruction value $I_S$ for standby to the selected value, and then controlling the excitation current I of the solenoid for the variable orifice based on the finally added instruction values.

According to the power steering of the fifth and eighth inventions, the steering angular velocity ω is detected thereby to control the control flow rate QP at a value closer to that of the steering torque. Therefore, it is possible to appropriately secure the control flow rate QP to achieve the energy-saving type control.

When the steering wheel is held stationary, the control flow rate QP is appropriately secured by means of the steering angle θ, to allow the vehicle to resist the self-aligning torque.

Further, for example, in the vehicle travelling in a straight line, eaten when the solenoid current instruction value $I_θ$ based on the steering angle θ or the solenoid current instruction value $I_ω$ based on the steering angular velocity ω is zero, the standby flow rate can be secured. Therefore, the power steering can be prevented from seizure, and is capable of handling disturbances caused by a kick back or the like, and further sufficient response can be ensured.

In any of times when the steering wheel is turned, when the steering wheel is held stationary, and when the vehicle travels in a straight line, the control flow rate QP is appropriately secured not to increase the torque for driving the pump P more than necessary, resulting in making the correct energy-saving control implementable.

In the power steering, a signal of the steering angle, the steering angular velocity, the vehicle speed or the like has been conventionally used for controlling a steering reaction force on the output side or controlling sensitivity of the steering valve. However, the present invention has been made under the theme of energy savings and therefore uses a signal of the steering angle, the steering angular velocity, the vehicle speed or the like to control the control flow rate QP, which has not been seen in prior art.

The present invention approaches the subject of energy savings and has the principal feature in that a signal of the steering angle, the steering angular velocity, the vehicle speed or the like is used.

A ninth invention has configuration in which the controller is connected to a vehicle speed sensor, and calculates or stores a solenoid current instruction value $I_V$ in response to a vehicle speed signal from the vehicle speed sensor, while multiplying the any larger value of the solenoid current instruction values $I_\theta$ and $I_\omega$ by the solenoid current instruction value $I_V$, and adding the multiplied value to the solenoid current instruction value $I_S$.

According to the power steering of the sixth and ninth inventions, since the power steering is designed in a speed sensitive type, the energy-saving type control in accordance with the vehicle speed is allowed.

A tenth invention has configuration in which the controller is connected to a vehicle speed sensor, and calculates or stores a solenoid current instruction value $I_V$ in response to a vehicle speed signal from the vehicle speed sensor, while setting the solenoid current instruction value $I_V$ based on the vehicle speed signal as a threshold value with respect to the any larger value of the solenoid current instruction values $I_\theta$ and $I_\omega$, and adding a solenoid current instruction value under the set threshold value to the solenoid current instruction value $I_S$.

According to the power steering of the seventh and tenth inventions, it is designed in a vehicle-speed sensitive type, but the solenoid current instruction value $I_V$ based on the vehicle speed is used as a limiter, resulting in maintaining further sufficient response.

A eleventh invention has configuration in which the controller multiplies characteristics of the excitation current I of the solenoid and the control flow rate QP determined by the degree of opening of the variable orifice, and characteristics of the steering angle θ and the solenoid current instruction value $I_\theta$ together, to allow the steering angle θ and the control flow rate QP determined by the degree of opening of the variable orifice in accordance Faith a solenoid current I1 to have linear characteristics.

A twelfth invention has configuration in which the controller multiplies characteristics of the excitation current I of the solenoid and the control flow rate QP determined by the degree of opening of the variable orifice, and characteristics of the steering angular velocity ω and the solenoid current instruction value I2 together, to allow the steering angular velocity ω and the control flow rate QP determined by the degree of opening of the variable orifice in accordance with a solenoid current $I_\omega$ to have linear characteristics.

According to the power steering of the eleventh and twelfth inventions, since the control flow rate QP with respect to the steering angle is permitted to have further linear characteristics, a driver's steering feel can be improved.

Based on the aforementioned power steering, a thirteenth invention features as follows: the orifice is a variable orifice controlling the degree of its opening in accordance with an excitation current I of a solenoid. Also a controller is provided for controlling the excitation current I of the solenoid for the variable orifice. The controller is connected with a steering angle sensor, to calculate or store a steering angle θ and a steering angular velocity ω in accordance with a steering angle from the steering angle sensor, while the controller storing or calculating a solenoid current instruction value $I_{74}$ in accordance with the steering angle θ and a solenoid current instruction value $I_\omega$ in accordance with the steering angular velocity ω, and multiplying the solenoid current instruction value $I_\theta$ in accordance with the steering angle θ and a steering-angle current instruction value $I_{V1}$ in accordance with the vehicle speed together, while the current instruction values $I_\omega$ in accordance with the steering angular velocity ω being imparted with a threshold value defined by a steering-angular-velocity current instruction value $I_{V2}$ in response to the vehicle speed signal, and it being determined which of the multiplied value I1 of the solenoid current instruction values $I_\theta$ and $I_{V1}$ and the solenoid current I2 including the steering-angular-velocity current instruction value $I_{V2}$ as the threshold value is larger, to control the excitation current I of the solenoid for the variable orifice based on the larger value.

According to the thirteenth invention, since the solenoid excitation current I is determined with reference to the steering angle in high-speed travel, the safety of the steering can be ensured.

Also, since the solenoid excitation current I is determined with reference to the steering angular velocity in low-speed travel, the safety of the steering can be ensured.

Additionally, even in high-speed travel, it is possible to ensure the response within the range of the threshold value referred to the vehicle speed when the steering wheel is sharply and abruptly operated. This further improves the safety under the circumstances where the vehicle is steered around an obstacle during high-speed travel, and the like.

Also, when the steering wheel is held stationary, the control flow rate QP is properly secured by meant of the steering angle θ, to allow the vehicle to resist the self-aligning torque.

A fourteenth invention has configuration in which the larger current instruction value is added to a solenoid current instruction value $I_S$ for standby.

According to the fourteenth invention, it is possible to secure the standby flow rate even when the steering angle θ or the steering angular velocity ω is zero, for example, in travel of the vehicle in a straight line. Therefore, the power steering can be prevented from seizure, and is capable of handling disturbances caused by a kick back or the like, and further sufficient response can be ensured.

In either of the thirteenth invention or the fourteenth invention, in any of times when the steering wheel is turned, when the steering wheel is held stationary, and when the vehicle travels in a straight line, the control flow rate QP is appropriately secured not to increase the torque for driving the pump P more than necessary. This makes the correct energy-saving control implementable.

In the power steering, a signal of the steering angle, the steering angular velocity, the vehicle speed or the like has been conventionally used for controlling a steering reaction force on the output side or controlling sensitivity of the steering valve. However, the present invention has been made under the theme of energy savings and therefore uses a signal of the steering angle, the steering angular velocity, the vehicle speed or the like to control the control flow rate QP, which has not been seen in prior art.

The present invention approaches the subject of energy savings and has the principal feature in that a signal of the steering angle, the steering angular velocity, the vehicle speed or the like is used.

DETAILED DESCRIPTION OF THE PREFERRED EMBODIMENTS

Figure 1:
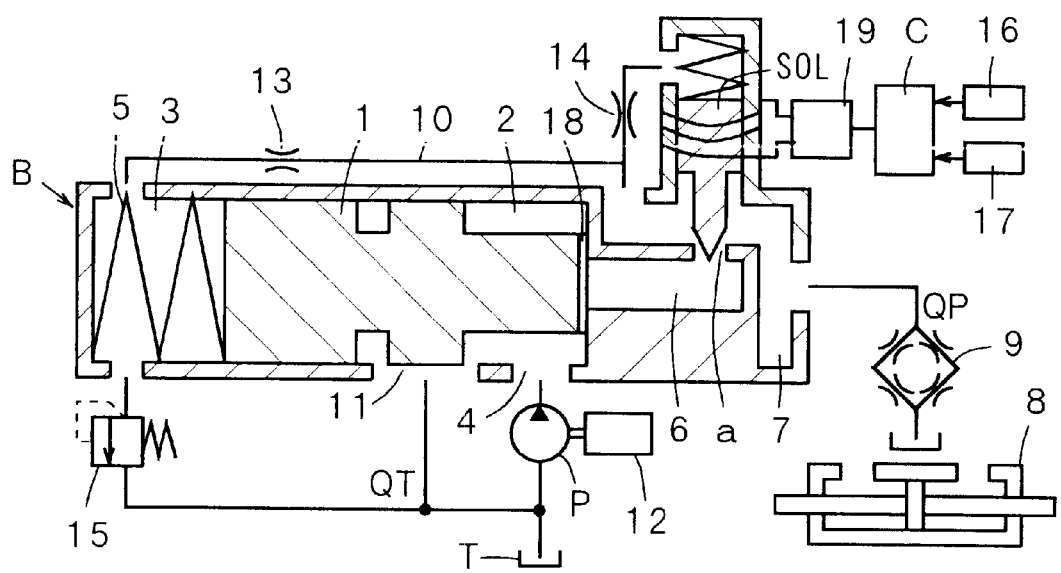
FIG. 1 is a pressure oil circuit diagram in first to fifth embodiment according to the present invention.
Figure 2:
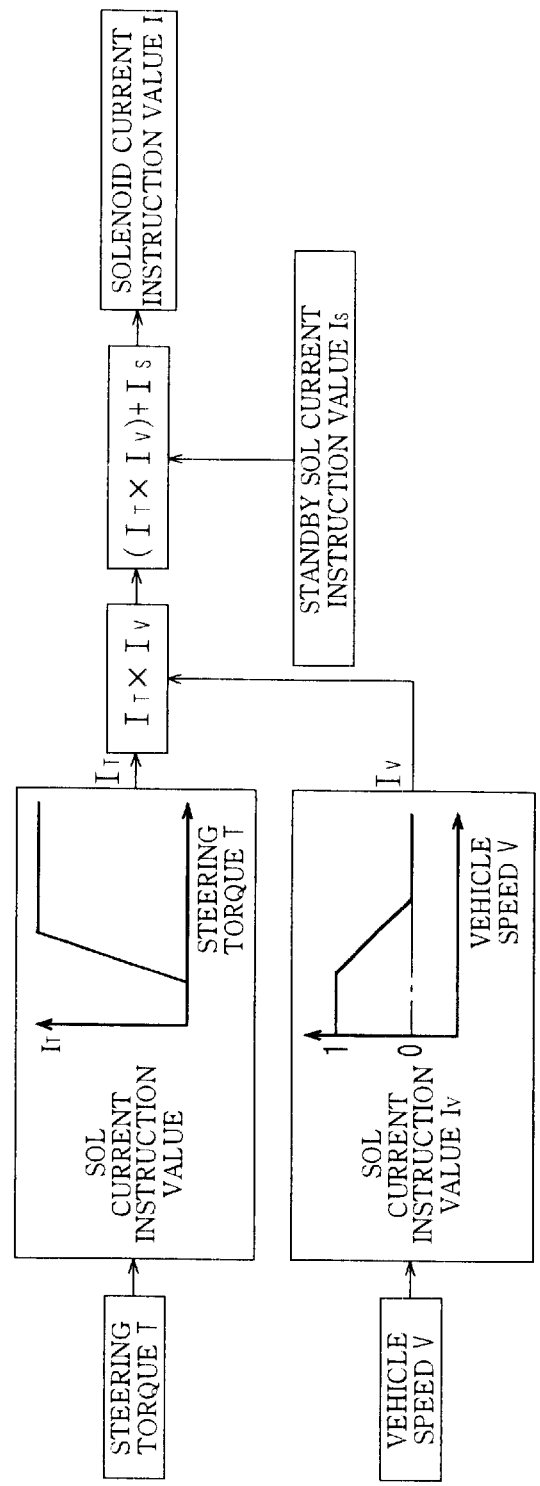
FIG. 2 is an explanatory drawing illustrating a control system of a controller in the first embodiment.

FIG. 1 and FIG. 2 illustrate a first embodiment. First, configuration of the entire power steering will be described with reference to FIG. 1.

A spool 1 of a flow control valve as well as a pump P is integrally mounted in a main body B.

The spool 1 has an end facing a pilot chamber 2 and the other end facing the other pilot chamber 3. The pilot chamber 2 communicates with the pump P through a pump port 4 at all times. The pilot chamber 3 includes a spring 5. Both the pilot chambers 2, 3 mutually communicate through a variable orifice a controlling the degree of opening in accordance with excitation current I of a solenoid SOL.

Specifically, the pilot chamber 2 communicates via a flow path 6, variable orifice a and flow path 7 with an inlet side of a steering valve 9 controlling a power cylinder 8. The pilot chamber 3 communicates via a flow path 10 and the flow path 7 with the inlet side of the steering valve 9.

Thus, both the pilot chambers 2, 3 communicate via the variable orifice a with each other. Pressure at the upstream from the variable orifice a acts on the pilot chamber 2, while pressure at the downstream acts on the pilot chamber 3.

The spool 1 stays at a position at which it can keep its balance between an acting force on the pilot chamber 2 and an acting force on the pilot chamber 3. At this balance position, the degree of opening between the pump port 4 and a tank port 11 is determined.

At the time a pump driving source 12 consisting of an engine and the like stops, pressure is not applied to the pump port 4. If pressure is not applied to the pump 4, then pressure is not produced in both the pilot chambers 2, 3. This results in action of tie spring 5 maintaining the spook 1, at a normal position as illustrated in FIG. 1.

From the above state, upon driving the pump P to supply pressure oil to the pump port 4, flowing of the pressure oil is produced in the variable orifice a, and this allows a pressure loss to occur therein. The differential pressure between the pilot chambers 2, 3 is produced due to the effect of the pressure loss. The spool 1 moves against the spring 5 in accordance with the differential pressure, and keeps the balance position.

In this way, the movement of the spool I against the spring 5 increases the degree of opening of the tank port 11. At this time, in accordance with the degree of opening of the tank port 11, distribution ratio between a control flow rate QP introduced toward the steering valve 9 and a return flow rate QT circulation-returned toward the tank T or the pump P is determined. In other words, the control flow rate QP is determined in accordance with the degree of opening of the tank port 11.

As described above, the control flow rate QP is controlled in accordance with the degree of opening of the tank port 11 which is determined by the movement position of the spool 1. This results in determining the control flow rate QP in accordance with the degree of opening of the variable orifice A. The reason is that the movement position of the spool 1 is determined by the differential pressure between both the pilot chambers 2, 3, and the differential pressure is determined by the degree of opening of the variable orifice a.

Thus, in order to control the control flow rate QP which adapts to a vehicle speed or a steering status of the vehicle, the degree of opening of the variable orifice a, or excitation current of the solenoid SOL may be controlled.

The reason is that when the solenoid SOL is in a non-excited state, the variable orifice a holds the degree of its opening minimum, and as the excitation current is increased, the degree of its opening is increased.

The steering valve 9 is for controlling the amount of supply of the power cylinder 8 in accordance with a steering torque of a steering wheel (not shown). For example, in large steering torque, the amount of supply to the power cylinder 8 is increased, whereas the amount of supply is decreased with reduction of steering torque. The amount of changeover of the steering torque and the steering valve 9 is determined by a torsion reaction of a torsion bar (not shown) or the like.

As explained above, when steering torque is large, as the amount of changeover of the steering valve 9 increases, a force assisted by the power cylinder 8 increases, whereas as the amount of changeover of the steering valve 9 decreases, the assisted force decreases.

If the flow rate QM required by the power cylinder 8 which is determined by steering torque and the control flow rate QP which is determined by a flow control valve V are made as equal as possible, it is possible to reduce an energy loss on the pump P side. The reason is that the energy loss on the pump P side is produced by a difference between the control flow rate QP and the flow rate QM required by the power cylinder 8.

In this way, in order to cause the control flow rate QP to approach the flow rate QM required by the power cylinder 8 as much as possible, excitation current for the solenoid SOL controls the degree of opening of the variable orifice a, and in turn is controlled by a controller C.

The controller C is connected to a steering torque sensor 16 and a vehicle speed sensor 17, and controls the excitation current of the solenoid SOL in response to output signals of both the sensors.

It should be noted that reference numeral 18 in FIG. 1 represents a slit formed at the end of the spool 1. Therefore, even when the spool 1 is at the position shown in the drawing, the pilot chamber 2 communicates through the slit 18 with the flow path 7 at all times. Put another way, even when the spool 1 is in the state shown in the drawing and the flow path 6 is closed, the discharge pressure of the pump P is supplied through the slit 18 toward the steering valve 9.

Although the flow rate is minutes, the pressure oil is still supplied toward the steering valve 9 for the purposes of preventing the entire power steering from seizure, preventing disturbances caused by a kick back or the like, and ensuring response. The details will be described later because these purposes can also be attained by ensuring a standby flow rate.

Reference numeral 19 represents a driver connected between the controller C and the solenoid SOL.

Further, reference numerals 13, 14 represent throttles, and reference numeral 15 represents a relief valve.

A control system of the above controller C is designed as illustrated in FIG. 2. Specifically, the controller C receives a steering torque signal from the steering torque sensor 16 and a vehicle speed signal from the vehicle speed sensor 17. The controller C calculates a steering torque T from the steering torque signal and a vehicle speed V from the vehicle speed signal. Based on the resulting steering torque T and vehicle speed V, the controller C determines a flow rate QM required by the power cylinder as follows.

The above steering torque T and a solenoid current instruction value $I_T$ are determined based on a theoretical value at which the relationship between the steering torque T and a control flow rate QP has linear characteristics.

At this point, while the steering torque T does not exceed a certain set value, the instruction value $I_T$ is adapted to be outputted at zero. Specifically, when the steering wheel is positioned at or around the center, the above instruction value $I_T$ is zero.

The solenoid current instruction value $I_T$ with respect to the steering torque T may be stored as a table value in the controller C in advance or may be calculated by the controller C based on the steering torque T as occasion demands.

In either case, the solenoid current instruction value $I_T$ is found based on the steering torque T, and the resulting value is multiplied by the solenoid current instruction value $I_V$ based on the vehicle speed V ($I_T \times I_V$).

In this point, the solenoid current instruction value $I_V$ based on the above vehicle speed V is outputted at 1 when a vehicle speed is in a low speed range, outputted at zero when the vehicle speed is in a high speed ranges and outputted at any value to the right of the decimal point between zero to 1 when it is in a medium speed range between the low and high speed ranges.

Thus, when the solenoid current instruction value $I_V$ based on the vehicle speed V is multiplied by the above solenoid current instruction value $I_T$, the value $I_T$ is outputted as it is in the low speed range of the vehicle speed, and outputted at zero in the high speed range. Further, in a medium speed range, as the speed increases, a value inversely proportional to the increased speed is outputted.

After finding $I_T \times I_V$ as explained above, the result is further added with a standby solenoid current instruction value $I_S$. That is, $(I_T \times I_V) + I_S = I$ (solenoid current instruction value) is outputted from the driver 19.

The standby solenoid current instruction value $I_S$ described above is set for supplying a predetermined current to the solenoid SOL of the variable orifice a at all times. In this way, the variable orifice a supplied with the standby solenoid current instruction value $I_S$ holds the degree of its opening constant, and secure a constant standby flow rate, even when the solenoid current instruction values $I_T$, $I_V$ based on the steering torque T and the vehicle speed V are zero.

However, from the viewpoint of energy savings, it is ideal that when the flow rate QM required by the power cylinder 8 and steering valve 9 side is zero, the control flow rate QP of the flow control valve V also becomes zero. The reason is described below.

Setting the control flow rate QP at zero means that the entire amount of discharge from the pump P is circulation-returned from the tank port 11 to the pump P or tank T. Since the flow path for circulation-returning it from the tank port 11 to the pump P or tank T is located in the main body B and short in length, a pressure loss is barely produced. Due to the pressure loss next to nothing, driving torque of the pump P is minimized, resulting in energy savings.

In this sense, when the required flow rate QM is zero, the control flow rate QP is set at zero. This is extremely advantageous in terms of energy savings.

In the face of this, the standby flow rate QS is provided even when the required flow rate QM is zero. There are three reasons as follows:

1) Prevention of the Power Steering From Seizure

Circulating oil somewhat through the power steering promises a cooling effect by the circulated oil, and therefore the standby flow rate serves the cooling function.

2) Resistance to a Disturbance Caused by a Kick Back or the Like, and Self-aligning Torque When the reaction caused by disturbances or self-aligning torque acts on wheel, it also acts on a rod of the power cylinder 8, If the standby flow rate is not secured, the wheels are unsteadied because of the reaction caused by the disturbances or self-aligning torque. However, if the standby flow rate is secured, the wheels are not unsteadied even in action of the above reaction. Specifically, since the rod of the above power cylinder 8 is engaged with a pinion and the like for changing over the steering valve 9, upon action of the effects, the steering valve is also switched to supply the standby flow rate in a direction opposing the effects. Therefore, securing the standby flow rate creates the possibility of resisting the above disturbance caused by a kick back or the like, and the self-aligning torque.

3) Ensuring of Response

Figure 3:
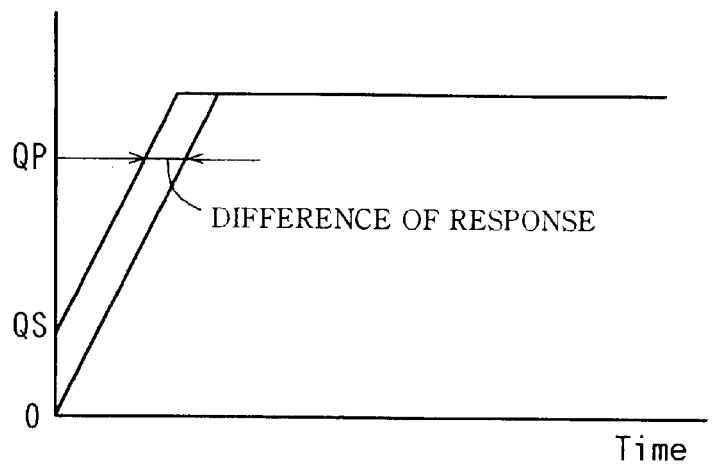
FIG. 3 is a graph showing a relationship between a standby flow rate and response.

As illustrated in FIG. 3, for example, if the standby flow rate QS is secured, a time taken to reach a target control flow rate QP is reduced in comparison with the case of no provision of the standby flow rate. The difference in time represents a lower response time, with the result that securing the standby flow rate QS can improve the response.

Operation of the first embodiment will be described below.

For example, if steering is performed with the vehicle speed in the low speed range, a solenoid current instruction value $I_T$ is determined by the steering torque in these circumstances. The instruction value $I_T$ is multiplied by a solenoid current instruction value $I_V=1$ in accordance with a vehicle speed V. The multiplied value $I_T$ is further added with a solenoid current instruction value $I_S$ for securing a standby flow rate.

In short, in the low speed range, a solenoid current instruction value I is $I = I_T + I_S$.

Even during vehicle travel in the low speed range as described above, when the steering wheel is kept around the center position during straight movement or the like, the solenoid current instruction value $I_T$ based on the steering torque becomes zero. However, similar to previously described case, since only the solenoid current instruction value $I_S$ is outputted, the standby flow rate is definitely secured.

Hence, even when the vehicle travels in a straight line in the low speed range, it is possible to promise the cooling effects for the power steering and resist the disturbances caused by a kick back or the like. Moreover, it is possible to maintain sufficient response due to the secured standby flow rate.

In all of the low, medium and high speed ranges, the performance of the standby flow rate is equally exerted in the vehicle travel.

When the vehicle speed is in the high speed range, the solenoid current instruction value $I_V$ based on the vehicle speed becomes zero. When the current instruction value $I_V$ becomes zero, $I_T \times I_V = 0$ is obtained. Therefore, the control flow rate QP results in only the standby flow rate QS and a power assist force almost dies.

While the vehicle travels in the medium speed range, since the solenoid current instruction value $I_V$ based on the vehicle speed reduces in accordance with the vehicle speed, the control flow rate QP also reduces with the reduction of the instruction value. Hence, the power assist force reduces by the same amount of reduction.

Figure 4:
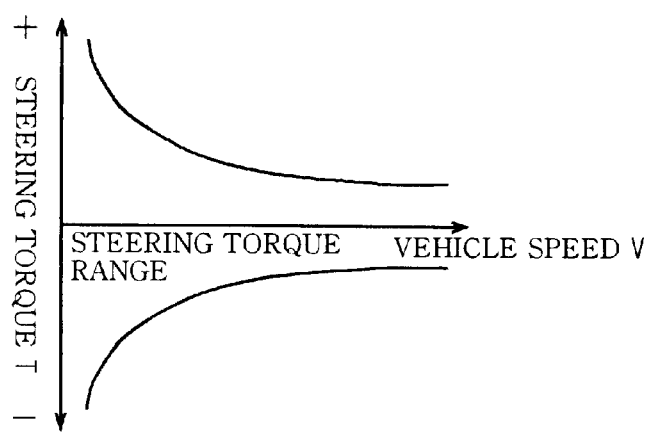
FIG. 4 is a graph showing a correlation between steering torque T and vehicle speed V.

In usually travelling, the steering wheel is not significantly turned during high-speed travel. Generally, the steering wheel is turned more significantly during travel in the low speed range. FIG. 4 illustrates the relationship between the vehicle speed and the steering. As is clear from FIG. 4, as the vehicle speed V increases, a range of the steering torque T becomes narrow around the midpoint. Hence, it can be said that the vehicle speed V stands in correlation with the range of the steering torque T. This allows use of the steering torque in place of the vehicle speed sensor.

However, use of the vehicle sensor 17 for thought of the solenoid current instruction.value $I_V$ permits further control which is suitable for the actual travel of the vehicle.

Figure 5:
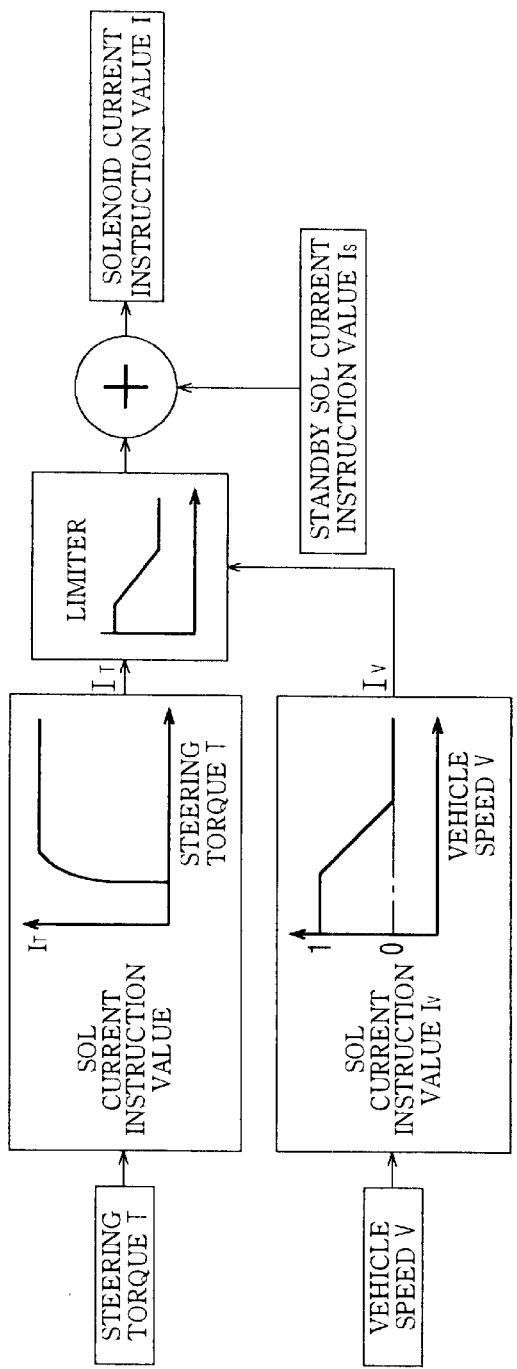
FIG. 5 is an explanatory drawing illustrating a control system of a controller in the second embodiment.

A second embodiment illustrated in FIG. 5 features in that a solenoid current instruction value $I_T$ based on a steering torque T is brought closer to actual situation, which is a different point from the first embodiment. In comparison to the first embodiment, the second embodiment takes the following different points into account.

Figure 6:
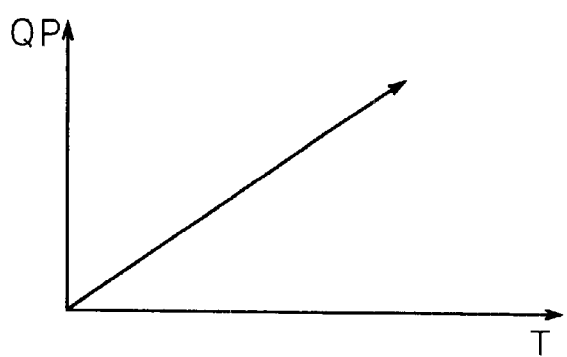
FIG. 6 is a graph showing a relationship between a steering toque T and a control flow rate QP.

Considering a driver's feel of steering, as illustrated in FIG. 6, it is ideal that the steering torque T and a control flow rate QP defined by the steering torque T maintain linear characteristics.

Figure 7:
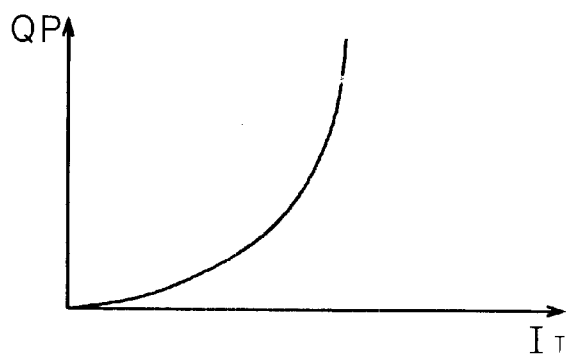
FIG. 7 is a graph showing a relationship between an instruction value $I_T$ of solenoid current and a control flow rate QP.

However, as illustrated in FIG. 7, the solenoid current instruction value I and the control flow rate QP determined by the degree of opening of the variable orifice a by the solenoid SOL are in a state close to square-law characteristics. This is a result of the synergistic action of the mass of a poppet and the like making up the variable orifice a, performance of the solenoid, and so on.

The first and second embodiments, however, intend to find a solenoid current instruction value $I_T$ by the steering torque T, and use the resulting instruction value $I_T$ to define the control flow rate QP. Therefore, if they are used as found, the steering torque and the control flow rate QP does not have a linear relation.

With this being the case, in the second embodiment, the solenoid current instruction value $I_T$ based on the steering torque is set to describe a curve-like line until the control flow rate QP reaches the maximum flow rate as illustrated in FIG. 5.

To obtain the curve, for example, points at which the steering torque T and the control flow rate QP may have linear characteristics shown in FIG. 6 may be plotted by experiment. Alternatively, the curve in FIG. 7 and the curve in FIG. 6 may undergo mathematization and a value in FIG. 6 can be divided by a value in FIG. 7 to find the curve of the instruction value $I_T$.

According to the second embodiment configured as described above, since the steering torque and the control flow rate QP have a linear relation, it is possible to match the output with the driver's feel of steering.

The second embodiment is also different from the first embodiment in that the solenoid current instruction value $T_V$ based on the vehicle speed V is used as a limiter. Specifically, in the first embodiment, the instruction value $I_T$ is multiplied by the instruction value $I_V$. When the instruction value $I_V$ is multiplied, however, as the vehicle speed V increases, the calculations reduce substantially. As the calculations reduce, the slope of the graph becomes more moderate. As the slope becomes moderate, the response becomes inferior.

For this reason, in the second embodiment, the solenoid current instruction value $I_V$ based on the vehicle speed is used as the limiter to hold the slope of the solenoid current instruction value I constant.

In actual fact, the changes of the slope are very small, such that ignoring the changes has little effect.

In the second embodiment, the standby flow rate is secured as in the case with the first embodiment.

Figure 8:
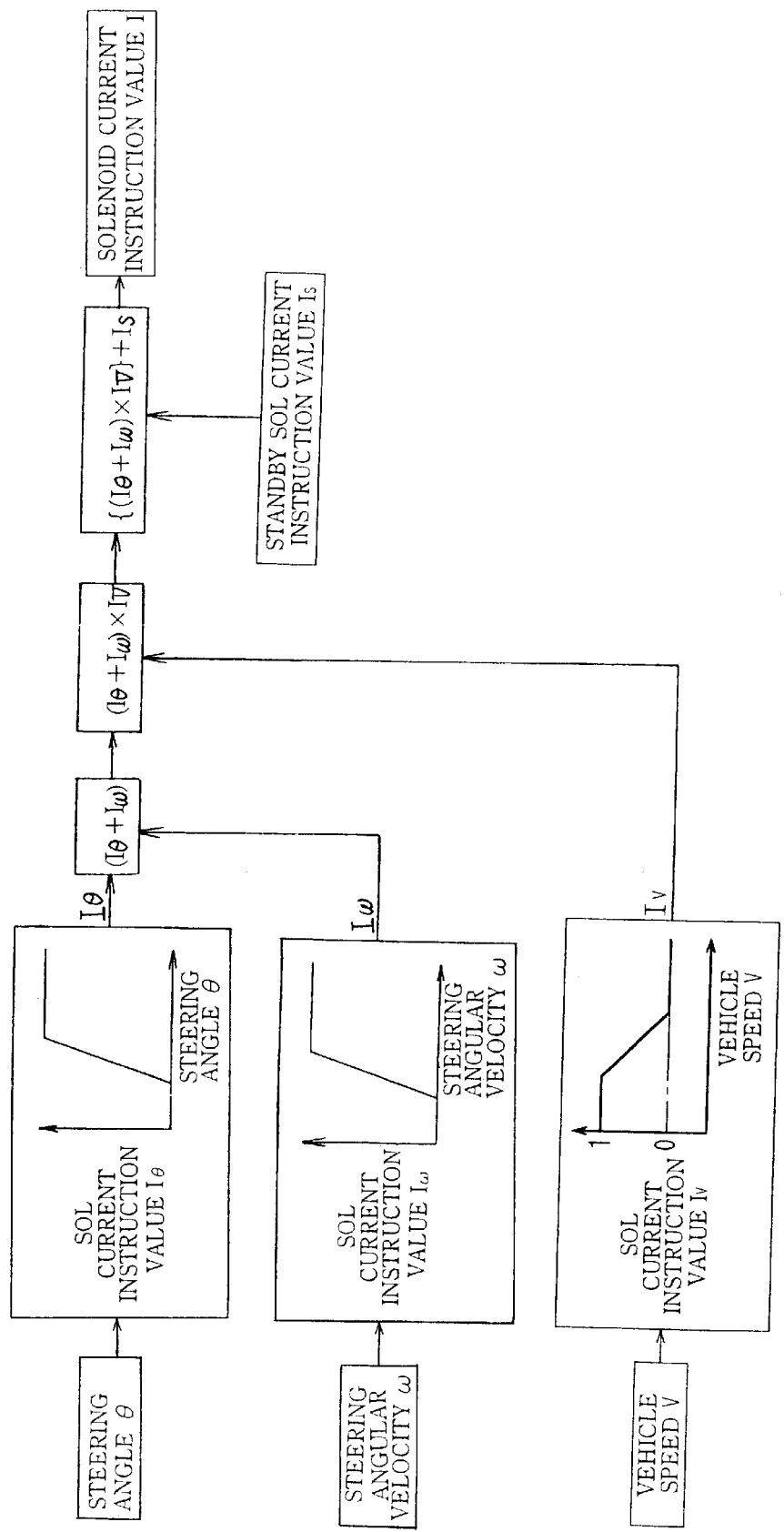
FIG. 8 is an explanatory drawing illustrating a control system of a controller in the third embodiment.

FIG. 8 illustrates a third embodiment which use a steering angle sensor 16 instead of the steering torque sensor in the first and second embodiments, in which the same reference numerals as those in the first and second embodiments are used to designate the same or similar components.

FIG. 8 illustrates a control system of the controller C connecting the steering angle sensor 16 with a vehicle speed sensor 17. Upon the controller C receiving a rudder angle signal from the steering angle sensor 16, the controller C calculates a steering angle θ and a steering angular velocity ω based on the received signal.

Based on the steering angle θ and the steering angular velocity ω, the aforementioned required flow rate QM is estimated.

As described in the first and second embodiments, the way of defining the required flow rate QM based on the steering torque provides an accurate control. However, for detecting the steering torque to control the degree of opening of the variable orifice a, a power steering system of the present condition must be extensively modified.

As in the third embodiment, therefore, if the required flow rate QM is estimated based on the steering angle θ and the steering angular velocity ω, it is barely required to modify the power steering system of the existing conditions.

The third embodiment in which the steering angle θ and the steering angular velocity ω are detected to estimate the required amount QM features significant cost reduction in comparison with the system in which the steering torque is directly detected. This feature also applies to a forth embodiment described later as matter of course.

From the above reason, the controller C controls excitation current of the solenoid SOL based on the steering angle θ and the steering angular velocity ω. The control characteristic is shown in FIG. 3.

The steering angle θ and a solenoid current instruction value $I_θ$ in FIG. 3 are determined based on a theoretical value at which the relationship between the steering angle θ and the control flow rate QP has linear characteristics. The relationship between the steering angular velocity ω and a solenoid current instruction value $I_ω$ is determined based on a theoretical value at which the steering angular velocity ω and the control flow rate QP have linear characteristics.

At this point, while the steering angle θ and the steering angular velocity ω do not exceed a certain set value, both the above instruction values $I_θ$ and $I_ω$ are outputted as zero. In other words, when the steering wheel is positioned at or around the center, the above instruction values $I_\theta$ and $I_\omega$ are zero.

The solenoid current instruction value $I_\theta$ with respect to the steering angle $\theta$ and the solenoid current instruction value $I_\omega$ with respect to the steering angular velocity $\omega$ may be stored as table values in the controller C in advance or may be calculated by the controller C based on the steering angle $\theta$ and the steering angular velocity $\omega$ as occasion demands.

In either case, the solenoid current instruction value $T_\theta$ and $I_\omega$ are found respectively based on the steering angle $\theta$ and the steering angular velocity $\omega$, and the resulting values are added. The added value $(I_\theta+I_\omega)$ is in turn multiplied by the solenoid current instruction value $I_V$ based on the vehicle speed signal.

At this point, the solenoid current instruction value $I_V$ based on the above vehicle speed signal is outputted at 1 when, a vehicle speed is in a low speed range, outputted at zero when the vehicle speed is in a high speed range, and outputted at any value to the right of the decimal point between zero and 1 when it is in a medium speed range between the low and high speed ranges.

Thus, when the solenoid current instruction $I_V$ based on the vehicle speed signal is multiplied by the above added value $(I_\theta+I_\omega)$, the value $(I_\theta+I_\omega)$ is outputted as it is in the low speed range of the vehicle speed, and outputted at zero in the high speed range. Further, in a medium speed range, as the speed increases, a value inversely proportional to the increased speed is outputted.

Upon finding $(I_\theta+I_\omega) \times I_V$ as explained above, the result is further added with a standby solenoid current instruction value $I_S$. That is, $\{(I_\theta+I_\omega) \times I_V\}+I_S \sim I$ (solenoid current instruction value) is outputted from the driver 19.

The standby solenoid current instruction value $I_S$ described above is set for supplying a predetermined current to the solenoid SOL of the variable orifice a at all times. In this way, the variable orifice a supplied with the standby solenoid current instruction value $I_S$ holds the degree of its opening constant, and secure a constant standby flow rate, even when the solenoid current instruction values which are based on the steering angle $\theta$, the steering angular velocity $\omega$ and the vehicle speed are zero.

However, from the viewpoint of energy savings, it is ideal that when the flow rate QM required by the power cylinder 8 and steering valve 9 side is zero, the control flow rate QP of the flow control valve V is also set to become zero. The reason is described below.

Setting the control flow rate QP at zero means that the entire amount of discharge from the pump P is circulation-returned from the tank port 11 to the pump P or tank T. Since the flow path for circulation-returning it from the tank port 11 to the pump P or tank T is located in the main body B and very short in length, a pressure loss is barely produced. Due to the pressure loss next to nothing, driving torque of the pump P is minimized, resulting in energy savings.

In this sense, when the required flow rate QM is zero, the control flow rate QP is set at zero. This is extremely advantageous in terms of energy savings.

In the face of this, the standby flow rate QS is provided even when the required flow rate QM is zero. There are three reasons as follows:

4) Prevention of the Power Steering From Seizure

Circulating oil somewhat through the power steering promises a cooling effect by the circulated oil, and therefore the standby flow rate serves the cooling function.

5) Resistance to a Disturbance Caused by a Kick Back or the Like, and Self-aligning Torque When the reaction caused by disturbances or self-aligning torque acts on wheel, it also acts on a rod of the power cylinder 8. If the standby flow rate is not secured, the wheels are unsteadied because of the reaction caused by the disturbances or self-aligning torque. However, if the standby flow rate is secured, the wheels are not unsteadied even in action of the above reaction. Specifically, since the rod of the above power cylinder 8 is engaged with a pinion and the like for changing over the steering valve 9, upon the action of the effects, the steering valve is also switched to supply the standby flow rate in a direction opposing the effects. Therefore, securing the standby flow rate creates the possibility of resisting the above disturbance caused by a kick back or the like, and the self-aligning torque.

6) Ensuring of Response

As illustrated in FIG. 3, for example, if the standby flow rate QS is secured, a time taken to reach a target control flow rate QP is reduced in comparison with the case of no provision of the standby flow rate. The difference in difference means a lower response time, with the result that securing the standby flow rate QS can improve response.

Operation of the third embodiment will be described below.

For example, if steering is performed with the vehicle speed in the low speed range, the solenoid current instruction values $I_\theta$ and $I_\omega$ are determined by the steering angle $\theta$ and the steering angular velocity $\omega$ in these circumstances. The instruction values are added and the added value $(I_\theta+I_\omega)$ is multiplied by a solenoid current instruction value $I_V=1$ based on a vehicle speed. The multiplied value $(I_\theta+I_\omega)$ is further added with a solenoid current instruction value $I_S$ for ensuring a standby flow rate.

In short, in the low speed range, a solenoid current instruction value I is $I=I_\theta+I_\omega+I_S$.

The reasons that the solenoid current instruction value $I_\theta$ based on the steering angle $\theta$ is added to the solenoid current instruction value $I_\omega$ based on the steering angular velocity $\omega$ as explained above, are as follows.

A first reason is for ensuring response. The way that the control flow rate QM is supplied always at a larger value that that of the flow rate QM required by the power cylinder 8 or the steering valve 9, improves the response of the power cylinder. For this reason, both the current values $I_\theta$, $I_\omega$ are added.

A second reason is for ensuring stability while the steering wheel is not turned. For example, the use of the steering torque is most appropriate for estimating the flow rate QM required by the steering valve 9 side as explained above. The steering angular velocity $\omega$ is most closely analogous to the steering torque.

Hence, theoretically, only the solenoid current instruction value $I_\omega$ based on the steering angular velocity $\omega$ can achieve the control in its own way. However, the steering angular velocity $\omega$ occurs only while the steering wheel is steered. For example, the steering wheel is steered at some angle, and then stopped at the rudder angle to be stationary. At this time, the steering angular velocity $\omega$ becomes zero.

If the control flow rate QP cannot be secured while the steering wheel is not turned as explained above, the power cylinder 8 is overcome by the reaction caused by the self aligning torque of the vehicle, and moves. If the power cylinder 8 cannot maintain its position and moves, it even becomes impossible to keep the stationary state of the steering wheel itself.

However, as explained above, by means of specifying the steering angle $\theta$ as parameter, the, steering angle $\theta$ is held even while the steering wheel is not turned, so that the solenoid current instruction value $I_\theta$ can be secured. Thus, a power required while the steering wheel is not turned can be retained by the solenoid current instruction value $I_\theta$.

In all of the low speed range, medium speed range and high speed range, the relationship between the steering angle $\theta$ and the steering angular velocity $\omega$ are equally applied to the travelling vehicle.

Even in vehicle travel in the low speed range, when the steering wheel is kept around the center position during straight movement or the like, the solenoid current instruction value $I_\theta$ based on the steering angle $\theta$ and the solenoid current instruction value $I_\omega$ based on the steering angular velocity $\omega$ become zero. However, similar to previously described case, since only the solenoid current instruction value $I_S$ is outputted, the standby flow rate is definitely secured.

Hence, even when the vehicle travels in a straight line in the low speed range, it is possible to promise the cooling effects for the power steering and resist the disturbances caused by a kick back or the like. Moreover, it is possible to maintain sufficient response due to the provision of the standby flow rate.

In all of the low, medium and high speed ranges, the performance of the standby flow rate is equally exerted during the vehicle travel.

When the vehicle speed is in the high speed range, the solenoid current instruction value $I_V$ based on the vehicle speed becomes zero. When the current instruction value $I_V$ becomes zero, $(I_\theta+I_\omega) \times I_V=0$ is obtained. Therefore, the control flow rate QP results in only the standby flow rate QS and a power assist force almost dies.

While the vehicle travels in the medium speed range, since the solenoid current instruction value $I_V$ based on the vehicle speed reduces in accordance with the vehicle speed, the control flow rate QP also reduces with the reduction of the instruction value. Thus, the power assist force reduces by the same amount of reduction.

Figure 9:
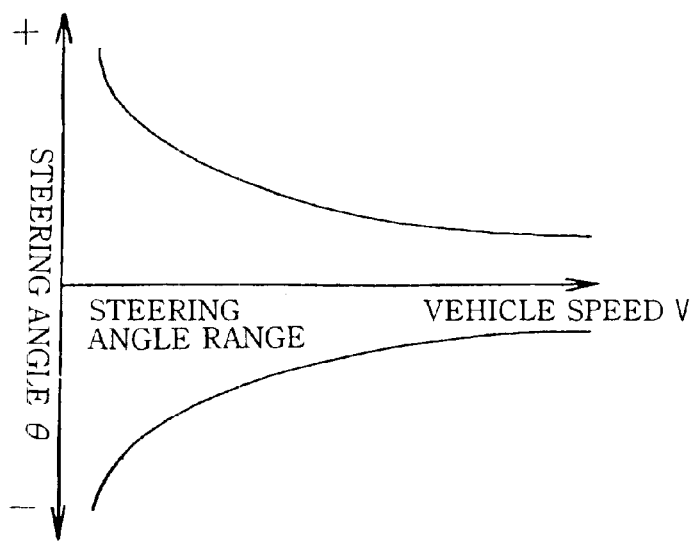
FIG. 9 is a graph showing a correlation between a steering angle $\theta$ and a vehicle speed V.
Figure 10:
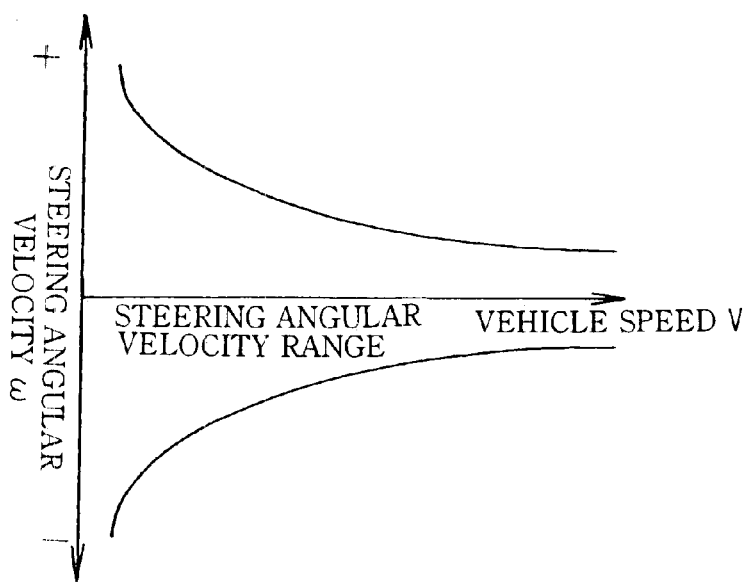
FIG. 10 is a graph showing a correlation between a steering angular velocity and a vehicle speed.

In usually travelling, the steering wheel is not significantly turned during high-speed travel. Generally, the steering wheel is turned more significantly during travel in the low speed range. FIG. 9 and FIG. 10 illustrate the relationship between the vehicle speed and the steering. As is clear from FIGS. 9, 10, as the vehicle speed V increases, each range of the steering angle $\theta$ and the steering angular velocity $\omega$ becomes narrow around the midpoint. Hence, it can be said that the vehicle speed stands in correlation with the range of the steering angle $\theta$ or steering angular velocity $\omega$. This allows use of the steering torque in place of the vehicle speed sensor 17.

From this reason, provision of the vehicle speed sensor 17 and consideration of the solenoid current instruction value $I_V$ in accordance with the vehicle speed, are not necessarily essential matters. However, use of the vehicle sensor 17 for consideration of the solenoid current instruction value $I_V$ permits further control suitable for actual vehicle travel.

Figure 11:
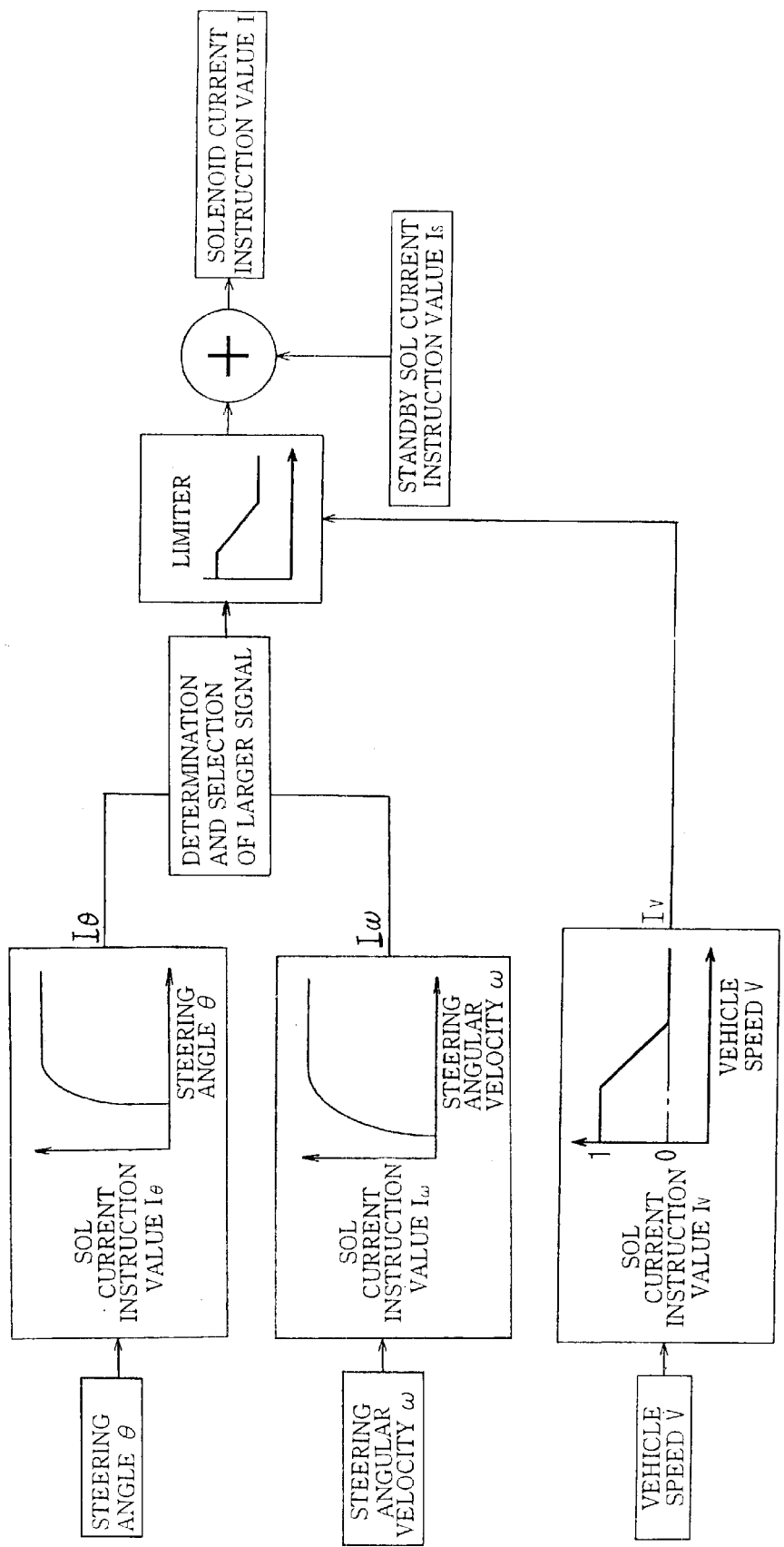
FIG. 11 is an explanatory drawing illustrating a control system of a controller in the fourth embodiment.

A fourth embodiment illustrated in FIG. 11 is different in the following two points from the third embodiment. A first point is that a solenoid current instruction value $I_\theta$ based on a steering angle $\theta$ and a solenoid current instruction value $I_\omega$ based on a steering angular velocity $\omega$ are brought closer to actual situation.

A second point is that the solenoid current instruction value $I_\theta$ based o:n the steering angle $\theta$ and the solenoid current instruction value $I_\omega$ based on the steering angular velocity $\omega$ are not added as done in the third embodiment, but a larger value is selected between them.

Figure 12:
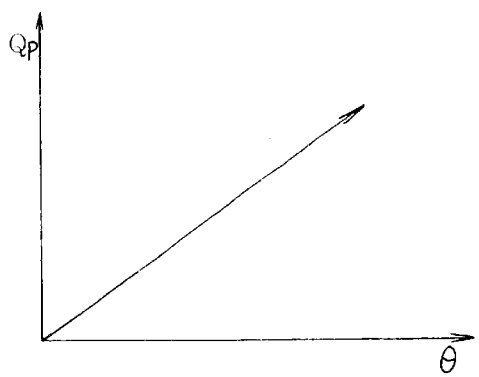
FIG. 12 is a graph showing a relationship between a steering angle $\theta$ and a control flow rate QP.

In the first point different from the third embodiment, the following is taken into account. Considering a driver's sense of steering, as illustrated in FIG. 12, it is ideal that the steering angle $\theta$ and a control flow rate QP defined by the steering angle $\theta$ maintain linear characteristics.

Figure 13:
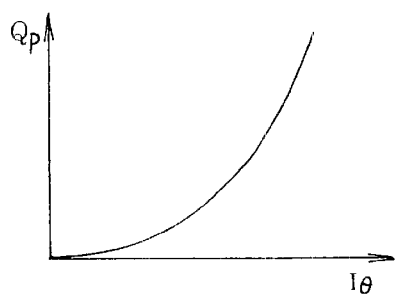
FIG. 13 is a graph showing a relationship between a solenoid instruction value $T_\theta$ and a control flow rate QP.

However, as illustrated in FIG. 13, the solenoid current instruction value I and the control flow rate QP determined by the degree of opening of the variable orifice a depending on the solenoid SOL are in a state close to square-law characteristics. This is a result of the synergistic action of the mass of a poppet or the like making up the variable orifice a, performance of the solenoid, and so on.

The third and fourth embodiments, however, intend to find a solenoid current instruction $I_\theta$ from the steering angle $\theta$, and use the resulting instruction value $I_\theta$ to define the control flow rate QP. Therefore, if it is used as found, the steering angle $\theta$ and the control flow rate QP does not have linear characteristics.

With this being the case, in the fourth embodiment, the solenoid current instruction value $I_\theta$ based on the steering angle $\theta$ is set to describe a curb-like line until the control flow rate QP reaches the maximum flow rate as illustrated in FIG. 11.

To obtain the curve, for example, points at which the steering angle $\theta$ and the control flow rate QP have linear characteristics shown in FIG. 12 may be plotted by experiment. Alternatively, the curve in FIG. 13 and the curve in FIG. 12 may undergo mathematization and a value in FIG. 12 can be divided by a value in FIG. 13 to find $\theta=f(I)$.

The same can be said with regard to the steering angular velocity $\omega$.

According to the fourth embodiment configured as described above, since each of the steering angle $\theta$ and steering angular velocity $\omega$, and the control flow rate QP have a linear relation, it is possible to match the output with the sense of steering.

A concept that the linear characteristics are given to the correlation between the control flow rate QP and each of the steering angle $\theta$ and steering angular velocity $\omega$ as described above can be applied to the foregoing third embodiment as a matter of course.

The following explanation is given because why any larger value is selected from the solenoid current instruction value $I_\theta$ based on the steering angle $\theta$ and the solenoid current instruction value $I_\omega$ based on the steering angular velocity $\omega$, which is described above as the second different point.

For example, in the third embodiment, the solenoid current instruction values $I_\theta$ and $I_\omega$ are added. However, such addition of the instruction values $I_\theta$ and $I_\omega$ effects increase in a deviation range of the value.

Figure 14:
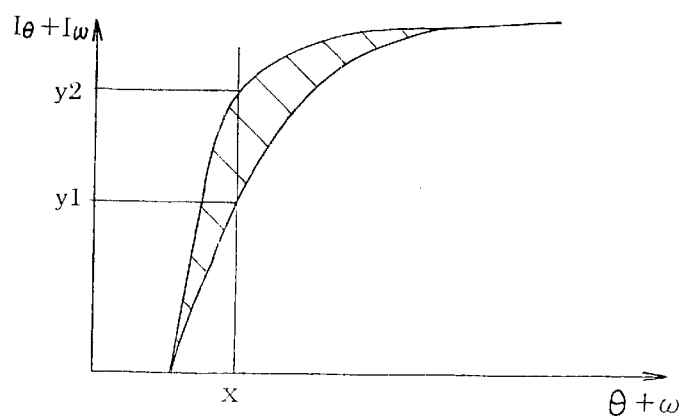
FIG. 14 is a graph showing a relationship between an added value of a steering angle $\theta$ and a steering angular velocity $\omega$, and an added value of solenoid current instruction values.

For example, as in the third embodiment, when the solenoid current instruction values $I_\theta$ and $I_\omega$ are added, a range as indicated with oblique lines in FIG. 14 is produced at points of the greatest rate of change on the curve of the graph. For example, observing the point x in FIG. 14, the value is either $x=\theta1+\omega2$, or $x=\theta2+\omega2$. When x results in the same value, even though particular added values are different from each other, a driver's steering feel is the same but the current instruction value $(I_\theta+I_\omega)$ is different in the range y1, y2.

This results in the same steering feel of the driver but the different outputs. For this reason, in the case of the third embodiment, the steering feel is sometimes slightly inferior.

In the fourth embodiment, therefore, only a larger value is selected from the solenoid current instruction values $I_\theta$ and $I_\omega$. By selecting one of the values in this way, the deviation range indicated with oblique lines in FIG. 14 can be minimized.

For ensuring the response, the larger value, rather than a smaller value, is selected from the solenoid current instruction values $I_\theta$ and $I_\omega$. As described above, the response is better when the control flow rate QP is larger than when it is smaller.

The fourth embodiment is also different from the third embodiment in that the solenoid current instruction value $I_V$ based on the vehicle speed is used as a limiter. Specifically, in the third embodiment, $(I_\theta + I_\omega)$ is multiplied by the above instruction value $I_V$. When the instruction value $I_V$ is multiplied, however, as the vehicle speed increases, the coefficient reduces substantially. As the coefficient reduces, the slope of the graph becomes moderate. As the slope becomes moderate, the response becomes inferior.

For this reason, in the fourth embodiment, the solenoid current instruction value $I_V$ based on the vehicle speed is used as the limiter to hold the slope of the solenoid current instruction value I constant.

In actual fact, the changes of the slope are very small, such that ignoring the changes has little effect.

In the fourth embodiment, therefore, the solenoid current instruction value $I_V$ based on the vehicle speed may be multiplied by any larger value of the solenoid current values $I_\theta$ and $I_\omega$.

However, use of the solenoid current instruction value $I_V$ based on the vehicle speed as a limiter can be also applied to the third embodiment.

In the fourth embodiment, the standby flow rate is secured as in the third embodiment.

Figure 15:
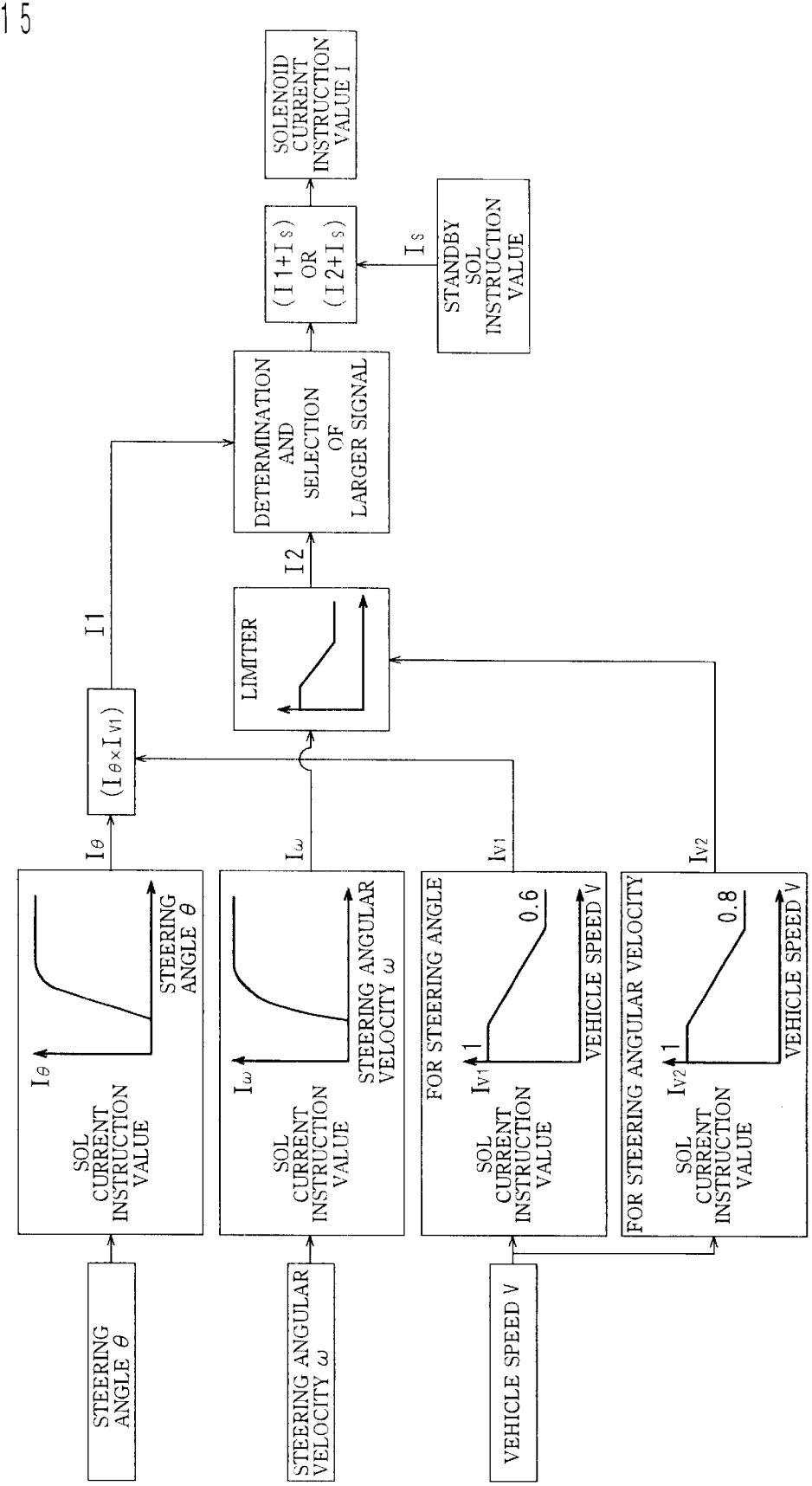
FIG. 15 is an explanatory drawing illustrating a control system of a controller in the fifth embodiment.

In a fifth embodiment illustrated in FIG. 15, upon reception of a rudder angle signal from a steering angle sensor 16, a controller C calculates a steering angle $\theta$ and a steering angular velocity $\omega$ in response to the received signal, and then estimates the required flow rate QM based on the steering angle $\theta$ and the steering angular velocity $\omega$.

In the fifth embodiment, since the required amount QM is estimated based on the steering angle $\theta$ and the steering angular velocity $\omega$, it is barely required to modify the power steering system of the existing conditions.

The controller C controls excitation current of the solenoid SOL based on the steering angle $\theta$ and the steering angular velocity $\omega$. Specifically, the steering angle $\theta$ and a solenoid current instruction value $I_\theta$ in FIG. 15 are determined based on a theoretical value at which the relationship between the steering angle $\theta$ and the control flow rate QP has linear characteristics. The relationship between the steering angular velocity $\omega$ and a solenoid current instruction value $I_\omega$ is determined based on a theoretical value at which the steering angular velocity $\omega$ and the control flow rate QP have linear characteristics.

At this point, while the steering angle $\theta$ and the steering angular velocity $\omega$ do not exceed a certain set value, both the instruction values $I_\theta$ and $I_\omega$ are outputted as zero. In other words, when the steering wheel is positioned at or around the center, the above instruction values $I_\theta$ and $I_\omega$ are zero.

The solenoid current instruction value $I_\theta$ with respect to the steering angle $\theta$ and the solenoid current instruction value $I_\omega$ with respect to the steering angular velocity $\omega$ may be stored as table values in the controller C in advance or may be calculated by the controller C based on the steering angle $\theta$ and the steering angular velocity $\omega$ as occasion demands.

Also, the controller C is designed to output a current instruction value $I_{V1}$ for the steering angle and a current instruction value $I_{V2}$ for the steering angular velocity based on an output signal from a vehicle speed sensor 17. However, the current instruction value $I_{V1}$ for the steering angle and the current instruction value $I_{V2}$ for the steering angular velocity may be stored as table values in the controller C in advance, or may be calculated by the controller C based on a vehicle speed V as occasion demands.

The above steering-angle current instruction value $I_{V1}$ is set to output at 1 in the low speed range, and at, for examples 0.6 in the highest speed range. The above steering-angular-velocity current instruction value $I_{V2}$ is set to output 1 in the low speed range, and at, for example, 0.8 in the highest speed range.

In other words, the steering-angle current instruction value $I_{V1}$ is controlled within the range between 0.6 and 1, while the steering-angular-velocity current instruction value it is controlled within the range between 0.8 and 1. Thus, the steering-angle current instruction value $I_{V1}$ has a larger gain from the low speed range to the highest speed range.

The solenoid current instruction value $I_\theta$ based on the above steering angle $\theta$ is multiplied by the steering-angle current instruction value $I_{V1}$ according to the vehicle speed V. Therefore, as the vehicle speed V is higher, an output value, which is the multiplied result, namely a current instruction value I1 relating to the steering angle is smaller. Moreover, since the gain of the steering-angle current instruction value $I_{V1}$ is set to be larger than a gain of the steering-angular-velocity current instruction value $I_{V2}$, the rate of decrease of the instruction value I1 increase as the vehicle speed is higher.

The solenoid current instruction value $I_\omega$ based on the steering angular velocity $\omega$ is set to output at a current instruction value I2 relating to the steering angular velocity, with using the steering-angular-velocity current instruction value $I_{V2}$ according to the vehicle speed V as a threshold value. The current instruction value I2 is also set to decrease in accordance with the vehicle speed, but its gain is smaller than the gain of the steering-angle current instruction value $I_{V1}$. Thus, the rate of decrease of the current instruction value I2 is smaller than the case of the current instruction value I1.

The current instruction value I1 relating to the steering angle and the current instruction value I2 relating to the steering angular velocity, which are outputted as explained above, are compared in numeric size, and any larger value of the values I1 and I2 is employed.

The reasons that any larger value of the values I1 and I2 will be described below. Usually, the current instruction value I1 relating to the steering angle is larger than the current instruction values I2 relating to the steering angular velocity because the steering wheel is seldom operated sharply and abruptly during high-speed travel.

Therefore, in high-speed travel, in order to improve safety and stability of the steering operation, the gain of the current instruction value I1 relating to the steering angle is increased with reference to the steering angles. In other words, as a travel speed is increased, the rate of decrease of the control flow rate QP is increased to further reduce energy loss.

On the other hand, in low-speed travel, since the steering wheel is often operated sharply and abruptly, the steering angular velocity is larger than the steering angle in most cases. When the steering angular velocity is larger, a premium is placed on the response.

Therefore, in low-speed travel, in order to improve operability, or response, of the steering operation, the gain of the current instruction value I2 relating to the steering angular velocity is decreased with reference to the steering angular velocity. In other words, even in somewhat accelerated travel speeds, when the steering wheel is sharply or abruptly operated, the control flow rate QP is sufficiently secured for giving the response priority.

Even when the vehicle travel speed is constant, the current instruction value I1 relating to the steering angle is sometimes larger, or the current instruction value I2 relating to the steering angular velocity is sometimes larger. For example, when the steering wheel is steered at a certain angle, and at the position of the steering angle θ, the steering wheel is stopped to hold stationary, the steering angular velocity ω becomes zero. Therefore, even during travel in an equal speeds at first, the current instruction value I2 relating to the steering angular velocity is larger, but after the steering wheel is held stationary, the current instruction value I1 relating to the steering angle is larger.

In either case, since any larger value of the current instruction values I1 and I2 is selected, any one of the current instruction values is outputted even under any travel conditions.

If both the current instruction values I1 and I2 are not outputted in the stationary state of the steering wheel as explained above, it is impossible to secure the control flow rate QP. When the control flow rate QP cannot be secured, the power cylinder 8 is overcome by the reaction caused by the self-aligning torque of the vehicle and moves. When the power cylinder 8 cannot hold its position and moves, it is impossible to hold the steering wheel stationary.

However, as described above, due to use of any one of the current instruction values I1 and I2, both of them never become zero during the steering operation. Put another way, since the steering angle θ is maintained even during the stationary state of the steering wheel, the solenoid current instruction value $I_\theta$ can be ensured. In consequence, a power required for holding the steering wheel stationary can be retained due to the current instruction value $I_\theta$.

Occasionally, the steering wheel is sharply or abruptly operated during high-speed travel. At this time, since the current instruction value I2 relating to the steering angular velocity is larger, the larger current instruction value I2 is selected. At this point, the current instruction value I2 is set as a value controlled to be within the range of threshold value of the steering-angular-velocity current instruction value $I_{v2}$, resulting in sufficiently ensuring safety.

At this point, the minimum threshold value of the steering-angular-velocity current instruction value $I_{v2}$ in high-speed travel of the vehicle, is set to be slightly larger than the minimum value of the steering-angle current instruction value $I_{v1}$. In the embodiment, specifically, as described above, the minimum value of the steering-angle current instruction value $I_{v1}$ is set at 0.6, and the minimum threshold value of the steering-angular-velocity current instruction value $I_{v2}$ is set at 0.8.

In consequence, in high-speed travel, the response is improved further in the case of control using the current instruction value I2 relating to the steering angular velocity than in the case of control using the current instruction I1 relating to the steering angle.

However, extremely quick response in high-speed travel has a potential danger that it adversely affects safety Thus, the minimum threshold value of the steering-angular-velocity current instruction $I_{v2}$ is set at 0.8, and the ground refers to safety based on a yaw rate of the vehicle.

Specifically, a yaw rate of the vehicle has characteristics of showing the virtually resembling convergence when the vehicle travels at a vehicle speed of approximately 60 km/h or less That is to say in vehicle travels at 60 km/h, at 10 km/h and even at 40 km/h, the convergence little varies. Such a range of stable convergence of a yaw rate is regarded as limitations of safety, and thus the minimum threshold value of the steering-angular-velocity current instruction value $I_{v2}$ is set at 0.8.

According to the fifth embodiment, when the steering wheel is sharply or abruptly operated during travel at 100 km/h, and a current instruction value I2 relating to the steering angular velocity increases, and then the increased current instruction value I2 is selected, it is possible to steer the vehicle with approximately the same level of safety and stability as those in travel at 60 km/h.

The selected current instruction value I1 or I2 as described above is added to a standby current instruction value $I_S$.

The standby current instruction value $I_S$ is for supplying a predetermined current to a solenoid SOL of a variable orifice a at all times. The variable orifice a supplied with the standby solenoid current, instruction value $I_S$ holds the degree of its opening constant, and secure a constant standby flow rate, even when the solenoid current instruction values based on the steering angle θ, the steering angular velocity ω and the vehicle speed V are zero.

However, from the viewpoint of energy savings, it is ideal that when the flow rate QM required by the power cylinder 8 and steering valve 9 side is zero, the control flow rate QP of the flow control valve V also become zero. The reason is described below.

Setting the control flow rate QP at zero means that the entire amount of discharge from the pump P is circulation-returned from the tank port 11 to the pump P or tank T. Since the flow path for circulation-returning it from the tank port 11 to the pump P or tank T is located in the main body B and short in length, a pressure loss is barely produced. Due to the pressure loss next to nothing, driving torque of the pump P is minimized, resulting in energy savings.

In this sense, when the required flow rate QM is zero, the control flow rate QP is set at zero. This is extremely advantageous in terms of energy savings.

In the face of this, the standby flow rate QS is secured even when the required flow rate QM is zero. There are three reasons as follows:

7) Prevention of the power steering from seizure

Circulating oil somewhat through the power steering promises a cooling effect by the circulated oil, and therefore the standby flow rate serves the cooling function 8) Resistance to a disturbance caused by a kick back or the like, and self-aligning torque When the reaction caused by disturbances or self-aligning torque acts on wheel, it also acts on a rod of the power cylinder 8. If the standby flow rate is not provided, the wheels are unsteadied because of the reaction caused by the disturbances or self-aligning torque. However, if the standby flow rate is secured, the wheels are not unsteadied even in action of the above reaction. Specifically, since the rod of the above power cylinder 8 is engaged with a pinion and the like for changing over the steering valve 9, upon action of the effects, the steering valve is also switched to supply the standby flow rate in a direction opposing the effects. Therefore, securing the standby flow rate creates the possibility of resisting the above disturbance caused by a kick back or the like, and the self-aligning torque.

9) Ensuring of response

As illustrated in FIG. 3, for example, if the standby flow rate QS is secured, a time taken to reach a target control flow rate QP is reduced in comparison with the case of no provision of the standby flow rate. The difference in time represents a lower response time, with the result that the securing the standby flow rate QS can improve the response.

Operation of the fifth embodiment will be described below.

Now, a current instruction value I1 relating to the steering angle which is a multiplied value of a solenoid current instruction value $I_θ$ based on the steering angle and a steering-angle current instruction value $I_{V1}$ is outputted during ravel of the vehicle, while a current instruction value I2 relating to the steering angular velocity in which the steering-angle current instruction value $I_{V1}$ according to the vehicle speed V is used as a threshold value for of a solenoid current instruction value $I_ω$ based on the steering angular velocity, is outputted.

Then, it is determined which of the current instruction value I1 relating to the steering angle and the current instruction value I2 relating to the steering angular velocity is larger, and the larger instruction value I1 or I2 is added to a standby current instruction value $I_S$ to determine a solenoid excitation current I at this time.

For the solenoid excitation current I, the current instruction value I1 relating to the steering angle is mainly used as the reference in high-speed travel of the vehicle, while the current instruction value I2 relating to the steering angular velocity is mainly used as the reference in low-speed travel of the vehicle.

At this point, according to the fifth embodiment, even in low-speed travel, the solenoid excitation current I is determined with reference to the current instruction value I1 relating to the steering angle when the steering wheel is held stationary.

Also, even in high-speed travel, the solenoid excitation current I is determined with reference to the current instruction value I2 relating to the steering angular velocity when the steering wheel is operated sharply and abruptly. In this case, however, even during travel at 100 km/h, the steering operation can be performed with approximately the same level of safety and stability as those in travel at 60 km/h as described above.

EXPLANATION OF REFERENCE NUMERALS

I SOLENOID CURRENT INSTRUCTION VALUE
$I_T$ SOLENOID CURRENT INSTRUCTION VALUE BASED ON STEERING TORQUE T
$I_V$ SOLENOID CURRENT INSTRUCTION VALUE EASED ON VEHICLE SPEED V
$I_S$ SOLENOID CURRENT INSTRUCTION VALUE FOR SECURING STANDBY FLOW RATE
$I_θ$ SOLENOID CURRENT INSTRUCTION VALUE BASED ON STEERING ANGLE θ
$I_ω$ SOLENOID CURRENT INSTRUCTION VALUE BASED ON STEERING ANGULAR VELOCITY ω
$I_{V1}$ STEERING-ANGLE CURRENT INSTRUCTION VALUE
$I_{V2}$ STEERING-ANGULAR-VELOCITY CURRENT INSTRUCTION VALUE
QP CONTROL FLOW RATE
QT RETURN FLOW RATE
QM REQUIRED FLOW RATE
QS STANDBY FLOW RATE
B MAIN BODY
P PUMP
a VARIABLE ORIFICE
SOL SOLENOID
C CONTROLLER
T TANK
1 SPOOL
2 PILOT COMER
3 PILOT CHAMBER
4 PUMP PORT
5 SPRING
8 POWER CYLINDER
9 STEERING VALVE
16 STEERING TORQUE SENSOR (STEERING ANGLE SENSOR)
17 VEHICLE SPEED SENSOR

What is claimed is:

1. A power steering, having a spool mounted in a main body and having one of ends facing one of pilot chambers communicating with a pump port at all times and the other end facing the other pilot chamber incorporating a spring, and having an orifice downstream from said one pilot chamber, and being configured to introduce pressure oil through the orifice into a steering valve for controlling a power cylinder, to control a movement position of the spool with a pressure balance between both the pilot chambers when pressure upstream from said orifice is set as a pilot pressure of said one pilot chamber and pressure downstream from said orifice is set as a pilot pressure of said other pilot chamber, and to distribute the pressure oil between a control flow rate QP for introducing the amount of discharge from a pump toward the steering valve and a return flow rate QT for making the pressure oil circulation-return toward a tank or the pump, said power steering wherein said orifice is a variable orifice controlling the degree of its opening in accordance with an excitation current I of a solenoid, comprising a controller provided for controlling the excitation current I of the solenoid for the variable orifice and connected with a steering angle sensor to calculate or store a steering angle θ and a steering angular velocity ω in accordance with a steering angle from the steering angle sensor, while storing or calculating a solenoid current instruction value $I_θ$ in accordance with the steering angle θ and a solenoid current instruction value $I_ω$ in accordance with the steering angular velocity ω, and selecting any larger solenoid current instruction value from the solenoid current instruction values $I_θ$ and $I_ω$, and adding a solenoid current instruction value $I_S$ for standby to the selected value, and then controlling the excitation current I of the solenoid for the variable orifice based on said finally added instruction value.

2. The power steering according to claim 1, wherein the controller is connected to a vehicle speed sensor, and calculates or stores a solenoid current instruction value $I_V$ in response to a vehicle speed signal from the vehicle speed sensor, while multiplying said any larger value of the solenoid current instruction values $I_θ$ and $I_ω$ by the solenoid current instruction value $I_V$, and adding the multiplied value to the solenoid current instruction value $I_S$.

3. The power steering according to claim 1, wherein the controller is connected to a vehicle speed sensor, and calculates or stores a solenoid current instruction value $I_V$ in response to a vehicle speed signal from the vehicle speed sensor, while setting the solenoid current instruction value $I_V$ based on the vehicle speed signal as a threshold value with respect to said any larger value of the solenoid current instruction values $I_θ$ and $I_ω$, and adding a solenoid current instruction value under the set threshold value to the solenoid current instruction value $I_S$.

4. A power steering, having a spool mounted in a main body and having one of ends facing one of pilot chambers communicating with a pump port at all times and the other end facing the other pilot chamber incorporating a spring, and having an orifice downstream from said one pilot chamber, and being configured to introduce pressure oil through the orifice into a steering valve for controlling a power cylinder, to control a movement position of the spool with a pressure balance between both the pilot chambers when pressure upstream from said orifice is set as a pilot pressure of said one pilot chamber and pressure downstream from said orifice is set as a pilot pressure of said other pilot chamber, and to distribute the pressure oil between a control flow rate QP for introducing the amount of discharge from a pump toward the steering valve and a return flow rate QT for making the pressure oil circulation-return toward a tank or the pump, said power steering wherein said orifice is a variable orifice controlling the degree of its opening in accordance with an excitation current I of a solenoid, comprising a controller provided for controlling the excitation current I of the solenoid for the variable orifice, and connected with a steering angle sensor, to calculate or store a steering angle $\theta$ and a steering angular velocity $\omega$ in accordance with a steering angle from the steering angle sensor, while storing or calculating a solenoid current instruction value $I_\theta$ in accordance with the steering angle $\theta$ and a solenoid current instruction value $I_\omega$ in accordance with the steering angular velocity $\omega$, and multiplying the solenoid current instruction value $I_\theta$ in accordance with the steering angle $\theta$ and a steering-angle current instruction value $I_{V1}$ in accordance with the vehicle speed together, while said current instruction values $I_\omega$ in accordance with the steering angular velocity $\omega$ being imparted with a threshold value defined by a steering-angular-velocity current instruction value $I_{V2}$ in response to the vehicle speed signal, and it being determined which of the multiplied value I1 of the solenoid current instruction values $I_\theta$ and $I_{V1}$ and the solenoid current I2 including the steering-angular-velocity current instruction value $I_{V2}$ as the threshold value is larger, to control the excitation current I of the solenoid for the variable orifice based on said larger value.

5. The power steering according to claim 4, wherein said larger current instruction value is added to a solenoid current instruction value $I_S$ for standby.

* * * * *